Patented July 2, 1935

2,006,687

UNITED STATES PATENT OFFICE 2,006,687

MATERIAL AND PROCESS OF MAKING THE SAME

Charles M. Riddock, Andover, Mass., assignor of one-half to M. H. Rourke, Boston, Mass.

No Drawing. Application January 13, 1934, Serial No. 706,536

4 Claims. (Cl. 18—50)

My invention is applicable to many purposes such as use as artificial leather, for shoe linings, for example, and such as use in wet weather garments. It is also useful for many other purposes and especially in structures where leather is now used.

The principal object of my invention is to provide a material which will resist abrasion and which will be pliable.

Another object is to provide a process for making such material.

Other objects will be referred to below.

A feature of my invention consists in the combination of rubber, fiber, preferably vegetable fiber, and material which is soluble, preferably in water.

The ingredients, and their proportions by weight, which I prefer to use are as follows:

100 parts of rubber;
80 parts of cotton fiber;
7 parts of zinc oxide;
3 parts of sulphur;
15 parts of Factice (oil substitute);
1 part of mercaptobenzothiazole; and
225 parts of sodium chloride.

I prefer to use crude rubber or equivalent material because it has greater tensile strength than reclaimed rubber and because it has greater binding qualities than reclaimed rubber. If reclaimed rubber is used the proportions of the other ingredients, except the vulcanizing ingredients, would be less.

The zinc oxide and mercaptobenzothiazole aid vulcanization while the sulphur is, of course, the main vulcanizing agent.

The Factice acts as a softener.

The sodium chloride, when dissolved by water and washed out, leaves the material in a very porous condition and provides, among other things, for what is known as breathing. The action of the water, after removal of the soluble material, tends to close up, or compact, the material and when the water is dried out or otherwise removed the material expands and becomes porous.

Any desired coloring pigments may be used.

The proportions given above of the various ingredients may be varied to obtain desired physical properties but in all cases there should be present rubber, fibrous material, and some material which is soluble so that it may be dissolved out. By the term rubber I mean to include such materials as balata and gutta percha.

The larger the amount of salt, for example, that is used the more pliable the product will be.

Heretofore leather substitutes or imitations with a rubber base have been waterproof and this characteristic limits their scope of use. My material is not, strictly speaking, waterproof but has capacity for breathing.

The fibers used are preferably vegetable and I suggest cotton, flax and jute.

The soluble materials which I prefer are sodium chloride, borax and soda.

In making my pliable material, according to the method I prefer, I mix the fibers and rubber and add the soluble material and also, as may be desired, add vulcanizing and coloring ingredients, and then calenderize the mixed material to the desired thickness, preferably in sheet form, and then vulcanize in any suitable way. After vulcanization I prefer to buff or sand one or both of the outside surfaces of the sheet, if the material is in sheet form, and then run the buffed material through a hot water bath to remove the soluble materials. The product is an absorbent material that has the appearance of a tanned sheep-skin.

The calendered product may be provided with a fabric backing or the mixture may be finished without a fabric backing as the mixture has inherent strength.

The finished product, seen under a microscope, shows a very porous condition, the pores being due to the removal of the soluble material.

The buffing, which I have referred to, gives a more or less nappy surface and also assists in carrying the water through the material more quickly so that the removal of the soluble material is accelerated although it is to be understood that the soluble material may be removed without buffing.

The fibrous material takes the stretch out of the rubber and contributes to the porosity and pliability.

The characteristic of resistance to abrasion is due to the fact that I may use relatively more rubber than heretofore because of my use of fiber and rubber as a homogeneous mass.

What I claim is:

1. The process of making a material of the character described consisting in mixing rubber, vegetable fiber, soluble material and vulcanizing material, then sheeting out the mixture to the desired thickness, then vulcanizing, then buffing and then applying a solvent to remove the soluble material.

2. The process of making a material of the character described consisting in mixing rubber, vegetable fiber, vulcanizing material and soluble material, then pressing the material to the desired thickness, then vulcanizing, then buffing, and then running the buffed material through a hot water bath to remove the soluble material.

3. The process of making a material of the character described consisting in mixing substantially 100 parts of rubber, substantially 80 parts of vegetable fiber, substantially seven parts of zinc oxide, substantially three parts of sulphur, substantiallly fifteen parts of Factice, substantially one part of mercaptobenzothiazole and substantially 225 parts of soluble material, then pressing the mixture to the desired thickness and vulcanizing, then buffing and then running the buffed material through a water bath to remove the soluble material.

4. A material of the character described having therein rubber and vegetable fiber and vulcanizing material and being formed by including soluble material and then sheeting out the mixture to the desired thickness and then vulcanizing, then buffing and then applying a solvent to remove the soluble material.

CHARLES M. RIDDOCK.